United States Patent
Sakoda

(10) Patent No.: US 10,520,028 B2
(45) Date of Patent: Dec. 31, 2019

(54) BEARING UNIT

(71) Applicant: NSK LTD., Tokyo (JP)

(72) Inventor: Hironari Sakoda, Fujisawa (JP)

(73) Assignee: NSK LTD., Tokyo (JP)

( * ) Notice: Subject to any disclaimer, the term of this patent is extended or adjusted under 35 U.S.C. 154(b) by 14 days.

(21) Appl. No.: 15/739,247

(22) PCT Filed: Apr. 25, 2016

(86) PCT No.: PCT/JP2016/062934
§ 371 (c)(1),
(2) Date: Dec. 22, 2017

(87) PCT Pub. No.: WO2017/013917
PCT Pub. Date: Jan. 26, 2017

(65) Prior Publication Data
US 2019/0023073 A1    Jan. 24, 2019

(30) Foreign Application Priority Data

Jul. 21, 2015 (JP) ................. 2015-144016

(51) Int. Cl.
*F16C 33/58* (2006.01)
*B60B 35/18* (2006.01)
*F16C 19/18* (2006.01)

(52) U.S. Cl.
CPC ............ *F16C 33/586* (2013.01); *B60B 35/18* (2013.01); *F16C 19/186* (2013.01);
(Continued)

(58) Field of Classification Search
CPC .... F16C 19/183; F16C 19/184; F16C 19/185; F16C 19/186; F16C 19/187; F16C 33/586;
(Continued)

(56) References Cited

U.S. PATENT DOCUMENTS 7,931,409 B2 *   4/2011   Kobayashi ............ F16C 19/186
                                                            301/105.1
9,056,523 B2 *   6/2015   Norimatsu ............ F16C 33/768
(Continued)

FOREIGN PATENT DOCUMENTS

JP    2005-98285 A    4/2005
JP    2005-170344 A   6/2005
(Continued)

OTHER PUBLICATIONS

Translation of JP2007071352 obtained Mar. 5, 2019.*
(Continued)

*Primary Examiner* — James Pilkington
(74) *Attorney, Agent, or Firm* — Sughrue Mion, PLLC

(57) ABSTRACT

An outer ring (2) is provided with a stationary ring-side flange (2a) along a circumferential direction. The stationary ring-side flange (2a) is provided with a plurality of mounting holes (2b) which is arranged at unequal intervals and which is used to fasten the outer ring (2) to a knuckle (N) through knuckle bolts (Bt). The stationary ring-side flange (2a) includes first flange part (30) located in a region in which a distance between adjacent mounting holes (2b) is larger and second flange part (40) located in a region in which a distance between adjacent mounting holes (2b) is smaller. A radial thickness of the first flange part (30) is a greater than a radial thickness of the second flange part (40).

1 Claim, 10 Drawing Sheets

(52) U.S. Cl.
CPC ...... *F16C 2240/60* (2013.01); *F16C 2240/70* (2013.01); *F16C 2326/02* (2013.01)

(58) Field of Classification Search
CPC ... F16C 2326/02; F16C 2240/60; B60B 35/18
See application file for complete search history.

(56) References Cited

U.S. PATENT DOCUMENTS

| | | | |
|---|---|---|---|
| 9,404,540 B2 * | 8/2016 | Takahashi | F16C 19/522 |
| 2005/0047937 A1 | 3/2005 | Inagaki et al. | |

FOREIGN PATENT DOCUMENTS

| | | |
|---|---|---|
| JP | 2007-71352 A | 3/2007 |
| JP | 2012-82870 A | 4/2012 |
| JP | 2012-148591 A | 8/2012 |
| JP | 2015-105670 A | 6/2015 |
| WO | 2015/050258 A1 | 4/2015 |

OTHER PUBLICATIONS

Search Report dated Aug. 2, 2016 by the International Searching Authority in counterpart International Patent Application No. PCT/JP2016/062934 (PCT/ISA/210).
Written Opinion dated Aug. 2, 2016 by the International Searching Authority in counterpart International Patent Application No. PCT/JP2016/062934 (PCT/ISA/237).
Communication dated May 4, 2018, issued by the European Patent Office in counterpart European application No. 16827481.9.
Communication dated Jan. 22, 2019, issued by the Japanese Patent Office in counterpart Japanese Application No. 2015-144016.

* cited by examiner

BEARING UNIT

CROSS REFERENCE TO RELATED APPLICATIONS

This application is a National Stage of International Application No. PCT/JP2016/062934 filed on Apr. 25, 2016, which claims priority from Japanese Patent Application No. 2015-144016 filed on Jul. 21, 2015, the contents of which are incorporated herein by reference.

TECHNICAL FIELD

The present invention relates to, for example, a bearing unit configured to rotatably support a wheel-side component (for example, a disc wheel) of an automobile to a vehicle body-side component (for example, a suspension device (knuckle)), and more particularly, to improvements on a stationary ring configuring a bearing unit and to be mounted to the vehicle body-side component.

RELATED ART

As shown in FIG. 10, for example, the bearing unit includes a rotating ring (hub ring) 4, a stationary ring (outer ring) 2, and a plurality of rolling elements 6, 8.

A mounting flange (rotating ring-side flange) 12a protrudes from an outer peripheral surface of the rotating ring 4. The rotating ring-side flange 12a is mounted to a wheel-side component (not shown) such as a disc wheel, so that the rotating ring 4 is coupled to be rotatable together with the wheel-side component.

The stationary ring 2 is disposed to be relatively rotatable to the rotating ring 4 at a radially outward side of the rotating ring 4. A mounting flange (stationary ring-side flange) 2a protrudes from an outer peripheral surface of the stationary ring 2. The stationary ring-side flange 2a is mounted to a vehicle body-side component N such as a knuckle, so that the stationary ring 2 is coupled (kept) to the wheel-side component in a non-rotating state.

The plurality of rolling elements 6, 8 is incorporated to be rotatable in multiple rows (for example, two rows) between the stationary ring 2 and the rotating ring 4.

A seal member (for example, a vehicle-side combined seal 10a and a wheel-side lip seal 10b) for sealing an inside of the bearing unit is provided between the stationary ring 2 and the rotating ring 4 in the radial direction. In the meantime, as the rolling elements 6, 8, the "balls" are exemplified in FIG. 10. However, "rollers" may also be applied, depending on a type, a using purpose and the like of the bearing unit.

The stationary ring (outer ring) 2 has a hollow cylindrical shape, and is disposed to cover the outer periphery of the rotating ring (inner ring) 4.

The stationary ring (outer ring) 2 has an outboard-side cylindrical part P1 having a hollow cylindrical shape and continuing to a wheel-side (outboard-side) of the stationary ring-side flange 2a, and an inboard-side cylindrical part P2 having a hollow cylindrical shape and continuing to a vehicle-side (inboard-side) of the stationary ring-side flange 2a. The outboard-side cylindrical part P1 continues in a circumferential direction with a predetermined thickness ranging from the stationary ring-side flange 2a to a wheel-side end portion E1. The inboard-side cylindrical part P2 continues in the circumferential direction with a predetermined thickness ranging from the stationary ring-side flange 2a to a vehicle body-side end portion E2.

The stationary ring-side flange 2a is provided in an unequal distribution in the circumferential direction of the outer peripheral surface of the stationary ring 2. The stationary ring-side flange 2a has four mounting holes 2b for coupling the same to the vehicle body-side component (knuckle) N via bolts (knuckle bolts) Bt.

The rotating ring (inner ring) 4 is provided with a hub 12 having a substantially cylindrical shape and configured to support a wheel-side component (for example, a disc wheel) and to rotate together with the wheel-side component. A hub flange (rotating ring-side flange) 12a to which a disc wheel, for example, is fixed protrudes from the hub 12. The hub flange 12a protrudes radially outward beyond the stationary ring (outer ring) 2. A plurality of hub bolts 14 arranged at predetermined intervals in the circumferential direction is provided in the vicinity of a protruding tip end edge of the hub flange 12a. The plurality of hub bolts 14 is inserted into bolt holes (not shown) formed in the disc wheel, and is fastened with hub nuts (not shown), so that it is possible to position and fix the disc wheel to the hub flange 12a.

The rotating ring (inner ring) 4 is fitted at its inboard-side with an annular rotating ring configuring body 16 (a separate inner ring that configures the rotating ring 4 together with the hub 12). In this case, for example, at a state where the plurality of rolling elements 6, 8 is incorporated between the stationary ring 2 and the rotating ring 4 (specifically, at a state where each of the rolling elements 6, 8 is held with a cage 18), the rotating ring configuring body 16 is fitted to a step portion 12b formed at the hub 12. Then, a swaged region 12m of a vehicle body-side end portion of the hub 12 is plastically deformed, so that the swaged region 12m is swaged (closely contacted) along an axial end face 16s of the rotating ring configuring body 16. Thereby, it is possible to fix the rotating ring configuring body 16 to the rotating ring 4 (hub 12).

At this time, the bearing unit is applied with a predetermined preload. At this state, the respective rolling elements 6, 8 of the multiple rows are rotatably incorporated with predetermined contact angles between the stationary ring 2 and the rotating ring 4 (specifically, between stationary ring raceways S1, S2 of the multiple rows and rotating ring raceways T1, T2 facing the same). At this time, action lines (not shown) connecting two contact points are perpendicular to each of the raceways S1, S2, T1, T2, pass centers of the rolling elements 6, 8, and intersect at one point (point of load application) on a central line of the bearing unit. Thereby, a back-to-back arrangement (DB) bearing is configured.

In the above configuration, the force that is applied to wheels during traveling of an automobile is all transmitted from the disc wheel to the knuckle N via the bearing unit. At this time, the bearing unit is applied with diverse loads (radial load, axial load, moment load and the like). However, since the bearing unit is configured as the back-to-back arrangement (DB) bearing as described above, the high stiffness is kept against the diverse loads.

In the meantime, the bearing unit is coupled with a constant-velocity joint (CVJ). For example, the constant-velocity joint (CVJ) is freely changed in terms of the angle, in conformity to a change in angle of a drive shaft, so that a driving force of predetermined torque is smoothly transmitted to the disc wheel via the bearing unit.

In the meantime, when fixing the stationary ring (outer ring) 2 to the knuckle N, the four knuckle bolts Bt are respectively inserted and fastened into the respective mounting holes 2b of the stationary ring-side flange 2a from the vehicle-side (inboard-side) of the knuckle N. At this time, the stationary ring-side flange 2a is warped (deformed), so that a posture of the stationary ring 2 is deformed and a knuckle pilot portion of the inboard-side cylindrical part P2 is contacted to the knuckle N. Thereby, the roundness (a degree of a circular shape deviating from a geometrically exact circle) of the stationary ring raceways S1, S2 of the multiple rows continuously formed in the circumferential direction along the inner periphery of the stationary ring (outer ring) 2 may be changed for worse.

That is, when the knuckle bolt Bt is inserted and fastened in the mounting hole 2b of the stationary ring-side flange 2a, a fastening force (a fastening force denoted with an arrow D1 in FIG. 10) is applied to the outboard-side cylindrical part P1 and the inboard-side cylindrical part P2. At this time, the fastening force applied to the outboard-side cylindrical part P1 partially acts in a direction of pulling the outboard-side cylindrical part P1 toward the stationary ring-side flange 2a (in other words, a direction of stretching the outboard-side cylindrical part P1; a direction denoted with an arrow D2 in FIG. 10). Thereby, the roundness of the outboard-side raceway S1 is changed for worse by a stretched degree of the outboard-side cylindrical part P1 toward the stationary ring-side flange part 2a. Then, the outboard-side raceway S1 is deformed into an elliptical shape of which a diameter is lengthened in one direction (an upper and lower direction in FIG. 10).

Also, the fastening force applied to the inboard-side cylindrical part P2 partially acts in a direction of shrinking the inboard-side cylindrical part P2 from the stationary ring-side flange part 2a (in other words, a direction of shrinking the inboard-side cylindrical part P2; a direction denoted with an arrow D3 in FIG. 10). Thereby, the roundness of the inboard-side raceway S2 is changed for worse by a shrunken degree of the inboard-side cylindrical part P2 from the stationary ring-side flange part 2a. Then, the inboard-side raceway S2 is deformed into an elliptical shape of which a diameter is lengthened in the other direction (i.e., a horizontal direction perpendicular to the upper and lower direction in which the outboard-side cylindrical part P1 is stretched).

As a first cause of the above deformation, flatness of a flange surface 2m of the stationary ring-side flange 2a or a bearing mounting surface Nm of the knuckle N is problematic. That is, since the planar surfaces, which are not the geometrically perfect flat surfaces, are closely contacted to each other by the plurality of (for example, three or four) knuckle bolts Bt, the portions adjacent to the respective knuckle bolts Bt can be closely contacted but the portions between the knuckle bolts Bt are deformed in a direction in which a gap is formed. As a result, the stationary ring-side flange part 2a is deformed in a convex shape toward the wheel-side (outboard-side), and the deformation is spread to the outboard-side cylindrical part P1 and the inboard-side cylindrical part P2, so that the roundness of the outboard-side raceway S1 and the inboard-side raceway S2 is changed for worse.

As measures against the above problem, for example, it may be considered to improve the flatness of the flange surface 2m and the bearing mounting surface Nm. However, the surface processing of intermittently cutting medium or high-carbon steel, which a source material of the stationary ring (outer ring) 2, requires much time and labor, so that the manufacturing cost of the bearing unit increases.

As a second cause of the above deformation, the flange surface 2m and the bearing mounting surface Nm of the knuckle N are deformed in the vicinity of the mounting holes 2b of the stationary ring-side flange 2a due to an influence of an axial force of the knuckle bolt Bt. Also in this deformation, like the first cause, the stationary ring-side flange part 2a is deformed in a convex shape toward the wheel-side (outboard-side), and the deformation is spread to the outboard-side cylindrical part P1 and the inboard-side cylindrical part P2, so that the roundness of the outboard-side raceway S1 and the inboard-side raceway S2 is changed for worse.

As measures against the above problem, a surface hardening treatment may be implemented for any one of the flange surface 2m and the bearing mounting surface Nm. However, in the case of the stationary ring (outer ring) 2 of which the outboard-side raceway S1 and the inboard-side raceway S2 are subjected to grinding processing after a predetermined heat treatment, it is difficult to implement the surface hardening treatment for the flange surface 2m without influencing each of the raceways S1, S2.

Also, as the other measures, for example, thicknesses of the outboard-side cylindrical part P1 and the inboard-side cylindrical part P2 of the stationary ring (outer ring) 2 may be increased to improve the stiffness thereof. According to this method, it is possible to prevent the roundness of the outboard-side raceway S1 and the inboard-side raceway S2 from being changed for worse. However, when the thicknesses of the outboard-side cylindrical part P1 and the inboard-side cylindrical part P2 are increased, the entire mass of the bearing unit is increased. In this case, an unsprung mass (weight) increases, which is contrary to the improvement of gas mileage and the energy saving and deteriorates the comfortability and drivability. Also, interference occurs when mounting and replacing the hub bolt.

Patent Document 1 is to prevent the deformation (the roundness change for worse of the outer ring) by increasing a thickness of a cylindrical part of the outer ring in the upper and lower direction. That is, Patent Document 1 discloses a bearing unit using a stationary ring (outer ring) 2 in which a region A3 located in the upper and lower direction is thickened and a region A4 located in a horizontal direction is thinned so as to prevent the mounting deformation upon fastening with the knuckle (refer to FIG. 11).

However, the structure disclosed in Patent Document 1 has following problems.

(1) According to the mounting surface stiffness distribution (structurally, the stiffness is different depending on places) of the knuckle structure, it cannot be said that the deformation in the upper and lower direction (vertical direction) is always high, and the deformation of the region in which a distance between the mounting holes of the stationary ring-side flange is large may be increased.

(2) According to the concavity and convexity distribution (flatness) of the mounting surface of the knuckle-side, it cannot be said that the deformation in the upper and lower direction (vertical direction) is always high, and the deformation of the region in which the distance between the mounting holes is large may be increased.

(3) The outer ring raceway is ground by an inner surface grinder on the basis of an outer diameter of the outer ring. When an outer diameter surface of the outer ring is made to have a non-circular shape so as to change a thickness, a datum surface cannot be secured, so that it is not possible to perform the grinding. Also, when the circular knuckle pilot portion is set as a datum surface, an axial distance with the raceway is increased, so that it is difficult to obtain the roundness of the raceway.

CITATION LIST

Patent Document

Patent Document 1: JP-A-2012-148591

SUMMARY OF THE INVENTION

Problems to be Solved

The present invention has been made in view of the above problems, and an object thereof is to provide a bearing unit capable of preventing deformation of a stationary ring-side mounting flange, and preventing deformation of a stationary ring raceway after mounting a vehicle body-side component.

Means for Solving Problems

In order to achieve the above object, a first invention of the present invention has a following configuration.

A bearing unit comprising:
an annular stationary ring mounted to a vehicle body-side component and to be held in a non-rotating state, and
a rotating ring provided to face the stationary ring, and configured to rotate together with a wheel-side component with being mounted thereto,
wherein the stationary ring is provided with a mounting flange along a circumferential direction,
wherein the mounting flange is provided with a plurality of mounting holes which is arranged at unequal intervals in the circumferential direction and which is used to fasten the stationary ring to the vehicle body-side component via bolts,
wherein the mounting flange includes a first flange part located in a region in which a distance between the mounting holes adjacent in the circumferential direction is larger, and a second flange part located in a region in which the distance between the adjacent mounting holes is smaller, and
wherein the first flange part has a radial thickness greater than the second flange part.

Regarding the first invention, a second invention of the present invention has a following configuration.

A surface of the first flange part facing the vehicle body-side component is provided with a thickness-reduced portion to reduce a contact area with a mounting surface of the vehicle body-side component.

Regarding the first or second invention, a third invention of the present invention has a following configuration.

The first flange part has an axial thickness greater than the second flange part.

Effects of the Invention

According to the present invention, it is possible to prevent deformation of the stationary ring-side mounting flange, and to prevent deformation of a stationary ring raceway after mounting a knuckle.

DETAILED DESCRIPTION OF EMBODIMENTS

Figure 10:
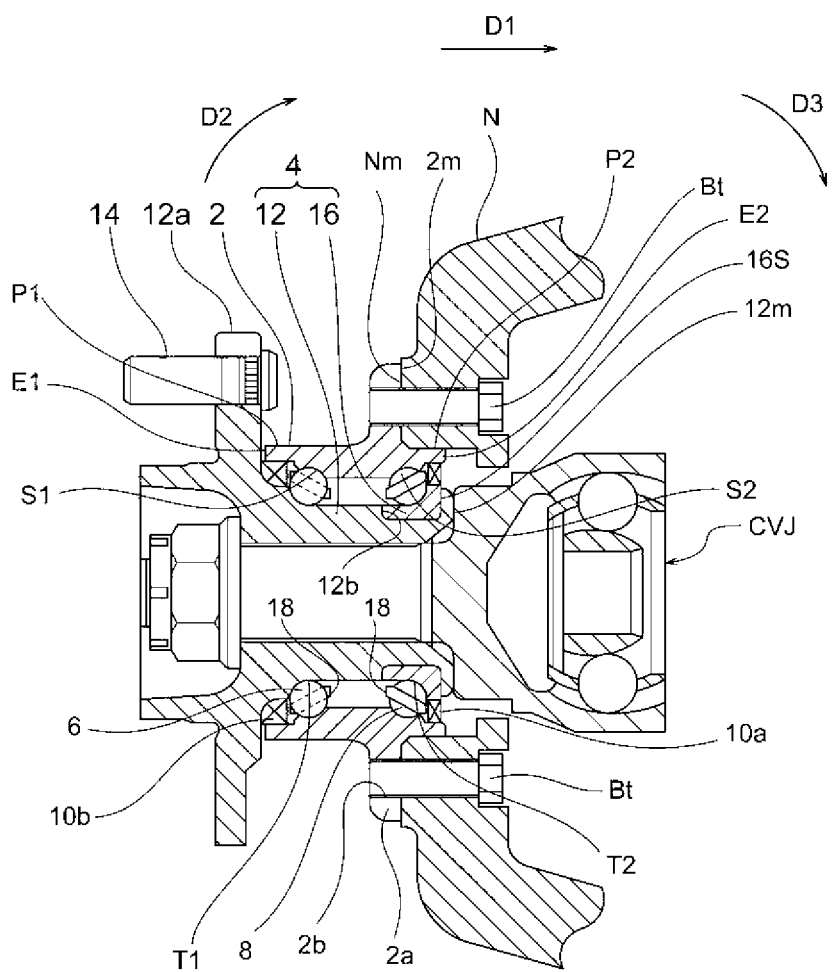
FIG. 10 is a schematic longitudinal sectional view depicting an example of the related art.
Figure 11:
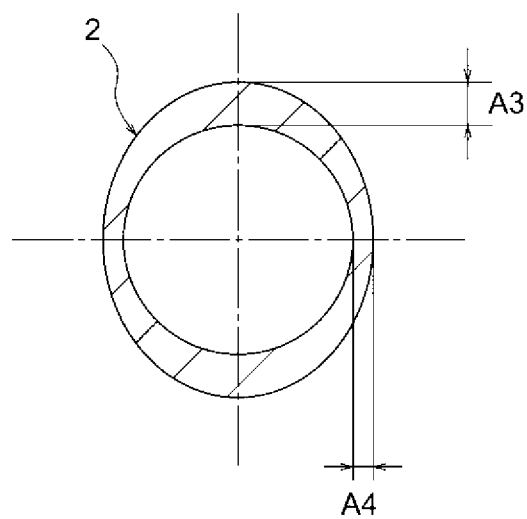
FIG. 11 depicts a stationary ring disclosed in Patent Document 1.

Hereinafter, a bearing unit of embodiments of the present invention will be described with reference to the accompanying drawings. The bearing unit of the embodiments has substantially the same configuration as the bearing unit shown in FIG. 10, except for the configuration of the stationary ring (outer ring) 2. The descriptions of the same configurations as the bearing unit shown in FIG. 10 are omitted, and only characteristic configurations of the stationary ring (outer ring) 2 are described.

First Embodiment

FIGS. 1A to 3B are schematic views depicting an example of a first embodiment of the stationary ring (outer ring) 2 that is applied to the bearing unit of the present invention.

The stationary ring (outer ring) 2 is provided integrally with a mounting flange (stationary ring-side flange) 2a. The mounting flange 2a includes an annular part 20a protruding radially outward from an outer peripheral surface of the stationary ring 2 by a predetermined radial height, and a plurality of protruding piece portions 20b protruding further radially outward from predetermined positions of an outer peripheral surface of the annular part 20a.

The four protruding piece portions 20b are arranged at unequal intervals in a circumferential direction. Each of the protruding piece portions 20b is formed with a mounting hole 2b for fixing the stationary ring (outer ring) 2 to the vehicle body-side component (knuckle) N.

As shown in FIGS. 1 and 2, a region A1 in which a distance between the mounting holes 2b adjacent in the circumferential direction is larger is set as a first flange part 30, and a region A2 in which a distance between the adjacent mounting holes 2b is smaller is set as a second flange part 40. The first flange part 30 is formed to be radially thicker than the second flange part 40 (a radial thickness W1 of the first flange part 30>a radial thickness W2 of the second flange part 40). A difference between the radial thickness W1 of the first flange part 30 and the radial thickness W2 of the second flange part 40 is not limited to the shown example, and can be design-changed within the scope of the present invention. Also, the radial thickness W1 of the first flange part 30 is constant in the region A1. However, the present invention is not limited thereto, and the radial thickness W1 may not be constant in the region A1. Also, in the first embodiment, the first flange part 30 reaches a rising portion of the protruding piece portion 20b. That is, as compared to the rising portion of the protruding piece portion 20b of the second flange part 40-side, the rising portion of the first flange part 30-side is thicker.

In this way, the radial thickness of the first flange part 30 in which the distance between the mounting holes 2b adjacent in the circumferential direction is large is formed to be thicker than the radial thickness of the second flange part 40 in which the distance between the adjacent mounting holes 2b is small, so that when inserting, fastening and fixing the knuckle bolts Bt into the mounting holes 2b of the stationary ring-side flange 2a, it is possible to prevent the stationary ring-side flange 2a from being warped (deformed), and to prevent deformation of the outer ring raceways S1, S2 after mounting the knuckle.

Figure 1A:
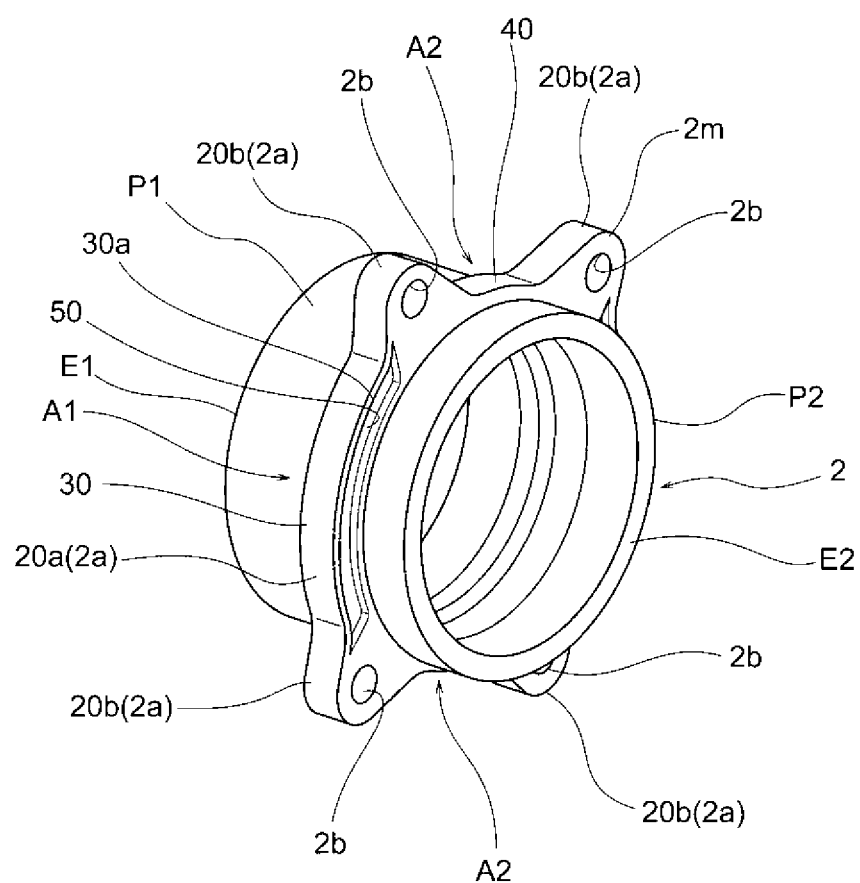
FIG. 1A is a schematic perspective view of a stationary ring of a first embodiment.
Figure 1B:
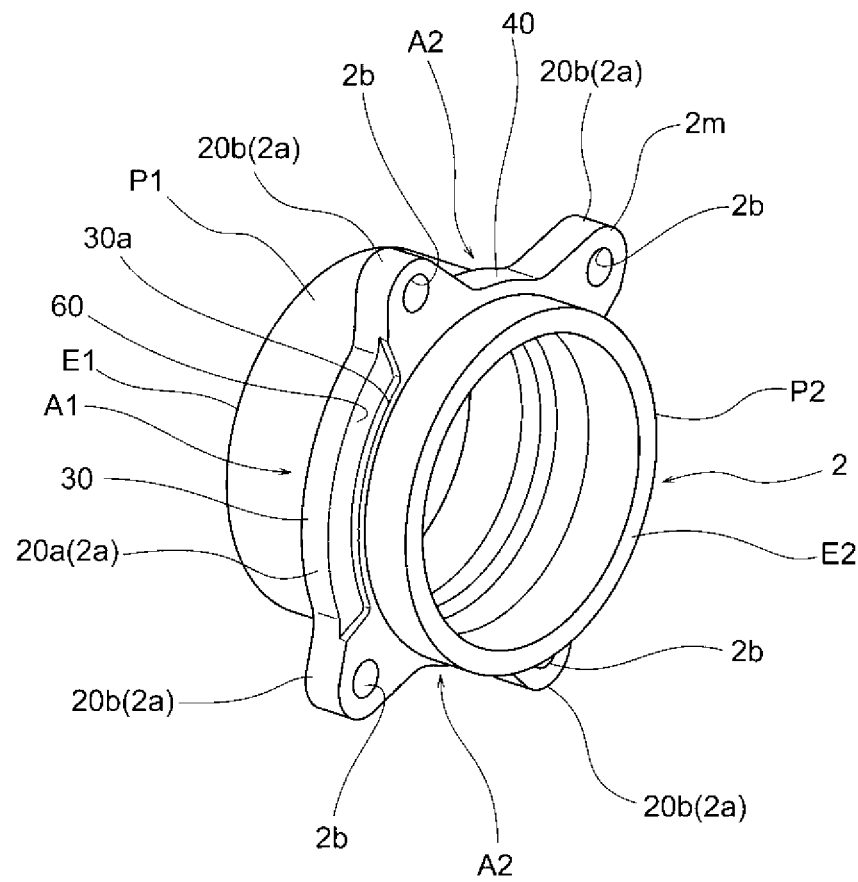
FIG. 1B is a schematic perspective view of another stationary ring of the first embodiment.
Figure 2A:
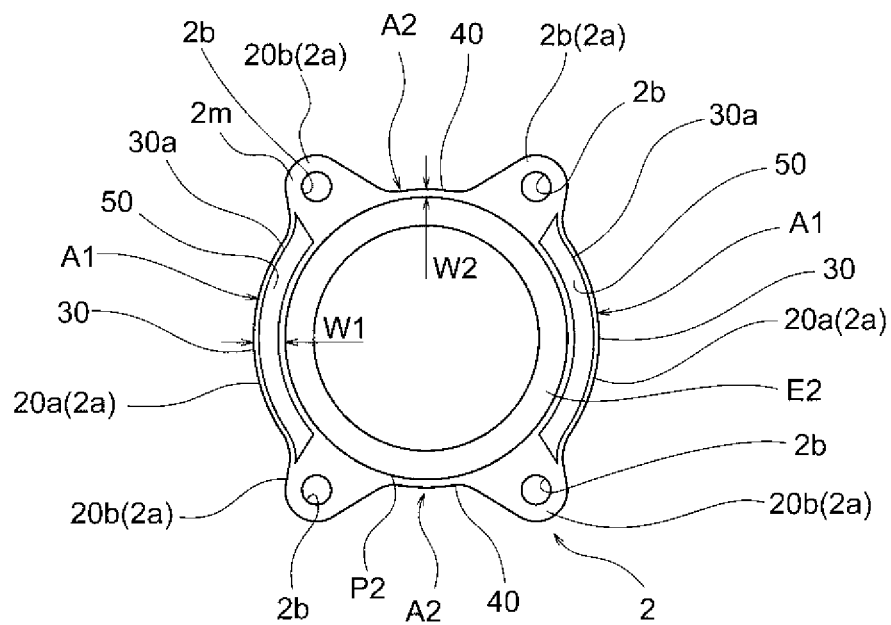
FIG. 2A is a schematic side view of the stationary ring shown in FIG. 1A.
Figure 2B:
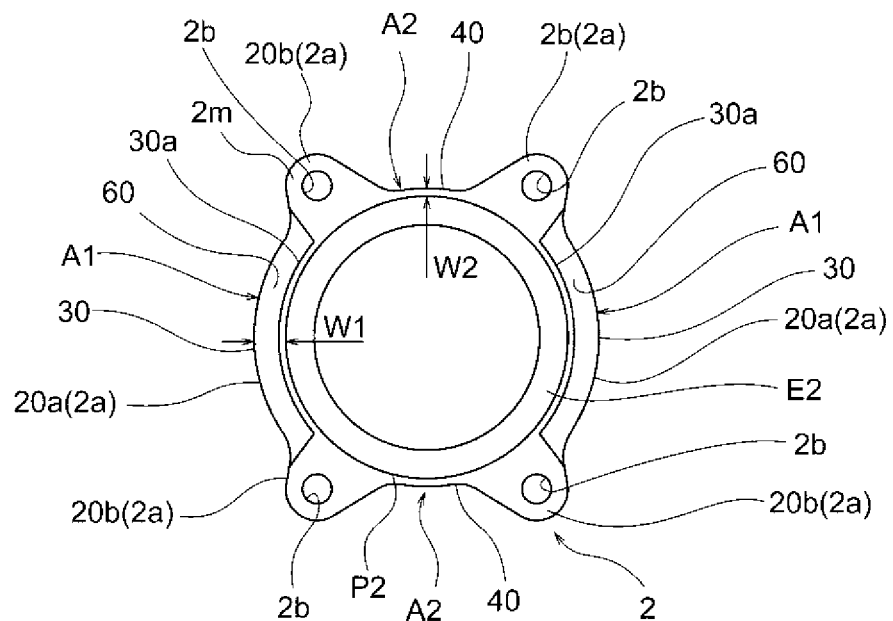
FIG. 2B is a schematic side view of the stationary ring shown in FIG. 1B.
Figure 3A:
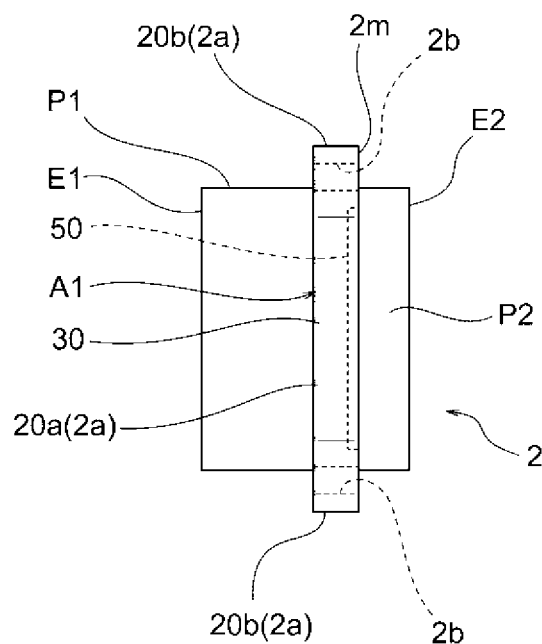
FIG. 3A is a schematic front view of the stationary ring shown in FIG. 1A.
Figure 3B:
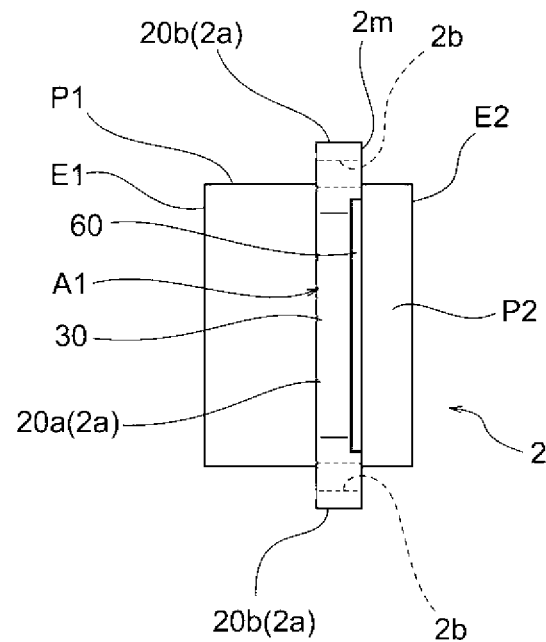
FIG. 3B is a schematic front view of the stationary ring shown in FIG. 1B.

Also, when forming (forging) an axial surface portion 30a of the first flange part 30 facing the inboard-side cylindrical part P2 (knuckle pilot portion), the axial surface portion 30a is recessed to form a thickness-reduced portion 50 (refer to FIGS. 1A, 2A and 3A). Alternatively, upon the formation (forging), the axial surface portion 30a may be formed to be axially stepped shape in order to form a thickness-reduced portion 60 (refer to FIGS. 1B, 2B and 3B). In this way, the thickness-reduced portion 50 or the thickness-reduced portion 60 is provided, so that a contact area with the bearing mounting surface Nm of the knuckle N is reduced to decrease a contact probability to the concavity and convexity of the bearing mounting surface Nm of the knuckle N. That is, the mounting deformation due to the influence of the concavity and convexity in the mounting surface region is reduced to contribute to the further deformation prevention of the outer ring raceways S1, S2 after mounting the knuckle.

In the meantime, the thickness-reduced portion 50 or the thickness-reduced portion 60 is not limited to the shown example, and can be design-changed within the scope of the present invention. For example, a circumferential length, a radial width, an axial depth and the like of the thickness-reduced portion 50 or the thickness-reduced portion 60 can be design-changed within the scope of the present invention. In the meantime, a circumferential length and a radial width of the axial surface portion 30a after forming the thickness-reduced portion 60 are also arbitrary. Also, in the first embodiment, the thickness-reduced portion 50 or the thickness-reduced portion 60 has the continuing groove shape (step shape) but may also be configured by a plurality of groove portions (step portions) divided in the circumferential direction. Also, a circumferential length, a radial width, an axial depth and the like of each divided thickness-reduced portion are arbitrary. In the meantime, it is optional whether the thickness-reduced portion is formed to have a step shape or a concave shape. However, when the thickness-reduced portion is formed to have a step shape, the lifetime of the forging die is prolonged. Also, when the concave shape is formed, like the thickness-reduced portion 50, since the stiffness of the first flange part 30 is improved, it is possible to suppress the roundness break of the double row stationary ring raceways S1, S2.

Second Embodiment

Figure 4:
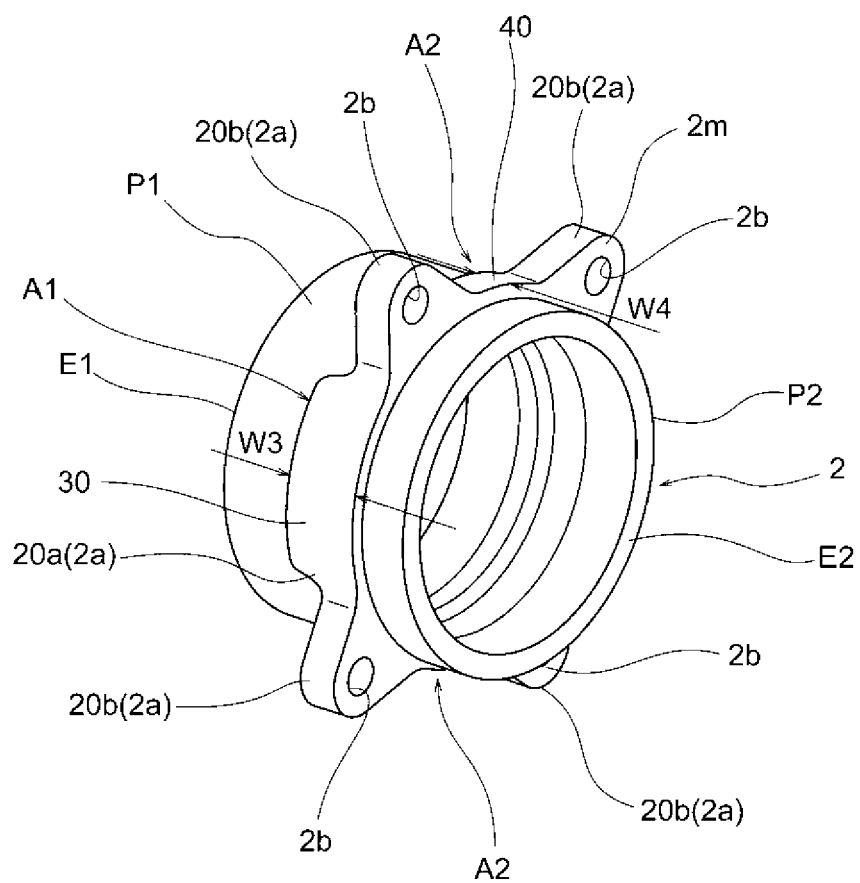
FIG. 4 is a schematic perspective view of a stationary ring of a second embodiment.
Figure 5:
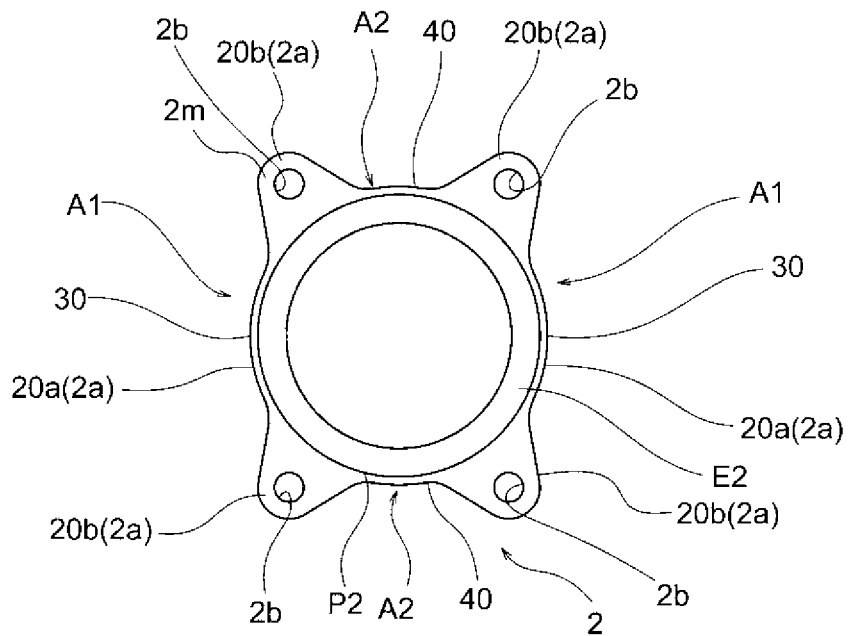
FIG. 5 is a schematic side view of the stationary ring shown in FIG. 4.
Figure 6:
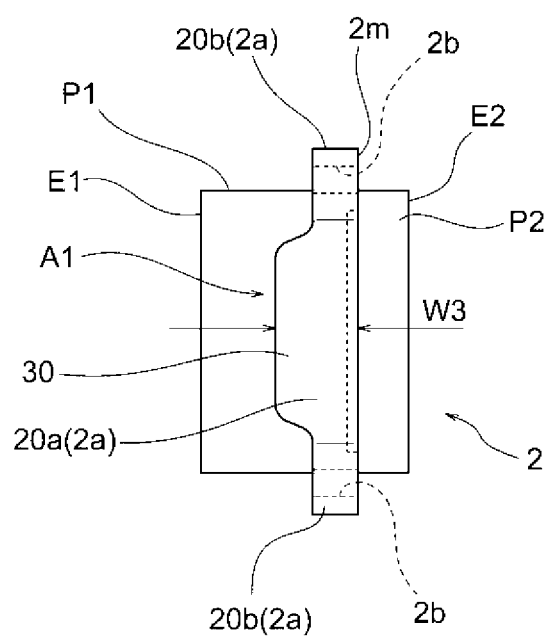
FIG. 6 is a schematic front view of the stationary ring shown in FIG. 4.

FIGS. 4 to 6 are schematic views depicting an example of a second embodiment of the stationary ring (outer ring) 2 that is applied to the bearing unit of the present invention.

As shown in FIGS. 4 to 6, in the second embodiment, the first flange part 30 located in the region A1 in which the distance between the mounting holes 2b adjacent in the circumferential direction is larger is formed to be axially thicker than the second flange part 40 located in the region A2 in which the distance between the adjacent mounting holes 2b is smaller (an axial thickness W3 of the first flange part 30>an axial thickness W4 of the second flange part 40). A difference between the axial thickness W3 of the first flange part 30 and the axial thickness W4 of the second flange part 40 is not limited to the shown example, and can be design-changed within the scope of the present invention. Also, the axial thickness W3 of the first flange part 30 is constant in the region A1. However, the present invention is not limited thereto, and the thickness may not be constant in the region A1.

In this way, the axial thickness W3 (a thickness in the cylinder axis of the cylindrical part of the outer ring) of the first flange part 30 in which the distance between the mounting holes 2b adjacent in the circumferential direction is large is formed to be greater than the axial thickness W4 of the second flange part 40 in which the distance between the adjacent mounting holes 2b is small, so that when inserting, fastening and fixing the knuckle bolts Bt into the mounting holes 2b of the stationary ring-side flange 2a, it is possible to prevent the stationary ring-side flange 2a from being warped (deformed), and to prevent deformation of the outer ring raceways S1, S2 after mounting the knuckle. When an axial dimension of the stationary ring-side flange 2a increases, the stiffness cubically increases with respect to the influence of the concavity and convexity of the bearing mounting surface Nm of the knuckle N. Therefore, the deformation suppression effect of the stationary ring-side flange 2a of the second embodiment further increases, as compared to the first embodiment. In the meantime, since the other configurations are the same as the first embodiment, the descriptions thereof are omitted.

Third Embodiment

FIGS. 7A to 9B are schematic views depicting an example of a third embodiment of the stationary ring (outer ring) 2 that is applied to the bearing unit of the present invention.

As shown in FIGS. 7A to 9B, in the third embodiment, the radial thickness W1 of the first flange part 30 located in the region A1 in which the distance between the mounting holes 2b adjacent in the circumferential direction is larger is formed to be greater than the radial thickness W2 of the second flange part 40 located in the region A2 in which the distance between the adjacent mounting holes 2b is smaller, and the axial thickness W3 of the first flange part 30 is formed to be greater than the axial thickness W4 of the second flange part 40 (the radial thickness W1 of the first flange part 30>the radial thickness W2 of the second flange part 40, and the axial thickness W3 of the first flange part 30>the axial thickness W4 of the second flange part 40). The differences between the radial and axial thicknesses of the first flange part 30 and the second flange part 40 are not limited to the shown example, and can be design-changed within the scope of the present invention.

In this way, the radial thickness W1 and the axial thickness W3 of the first flange part 30 in which the distance between the mounting holes 2b adjacent in the circumferential direction is large are formed to be greater than the radial thickness W2 and the axial thickness W4 of the second flange part 40 in which the distance between the adjacent mounting holes 2b is small, so that when inserting, fastening and fixing the knuckle bolts Bt into the mounting holes 2b of the stationary ring-side flange 2a, it is possible to further prevent the stationary ring-side flange 2a from being warped (deformed), and to prevent deformation of the outer ring raceways S1, S2 after mounting the knuckle.

Figure 7A:
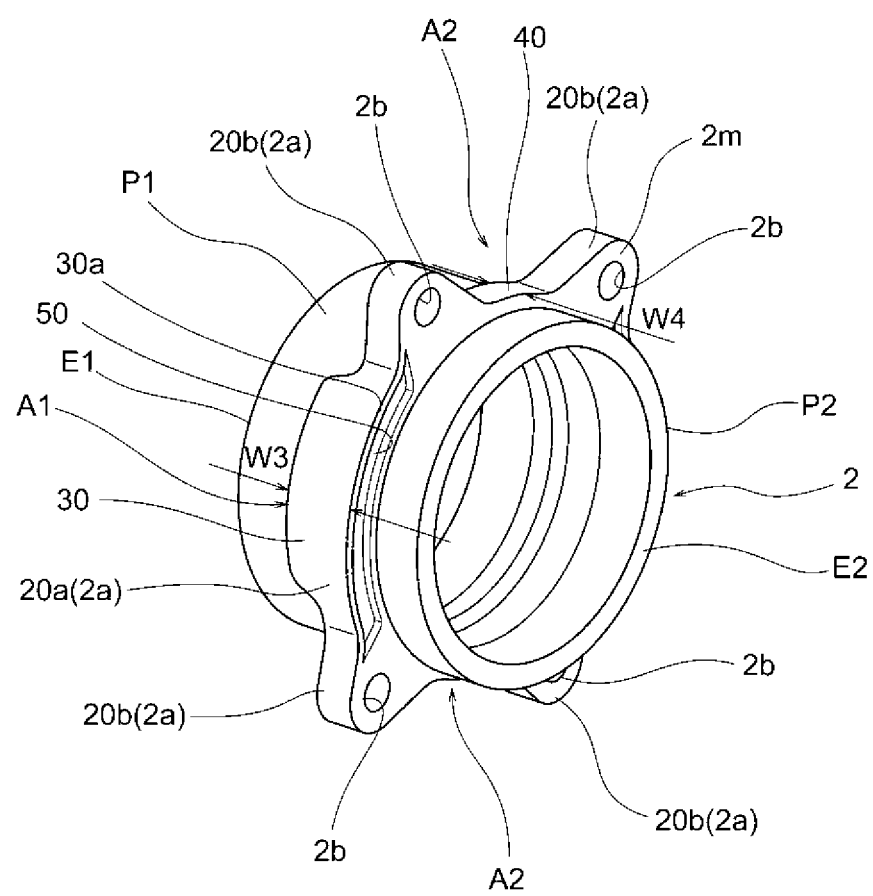
FIG. 7A is a schematic perspective view of a stationary ring of a third embodiment.
Figure 7B:
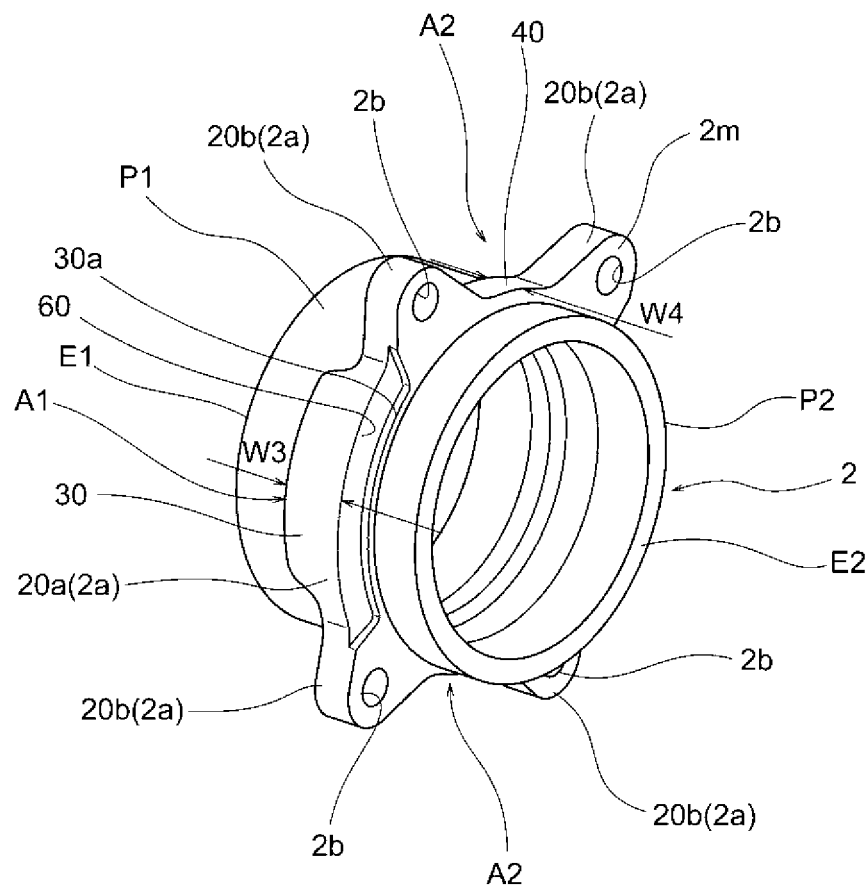
FIG. 7B is a schematic perspective view of the stationary ring of the third embodiment.
Figure 8A:
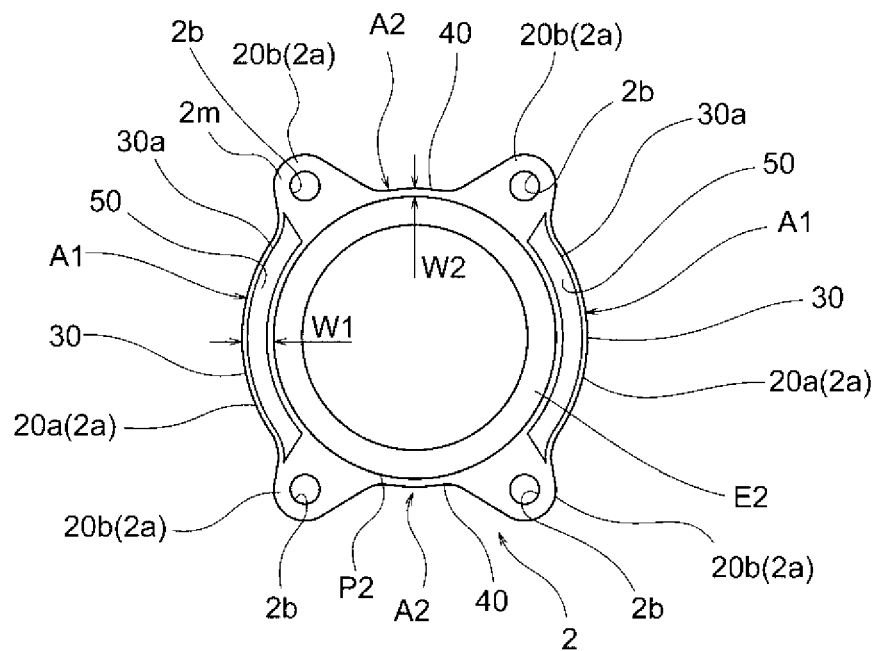
FIG. 8A is a schematic side view of the stationary ring shown in FIG. 7A.
Figure 8B:
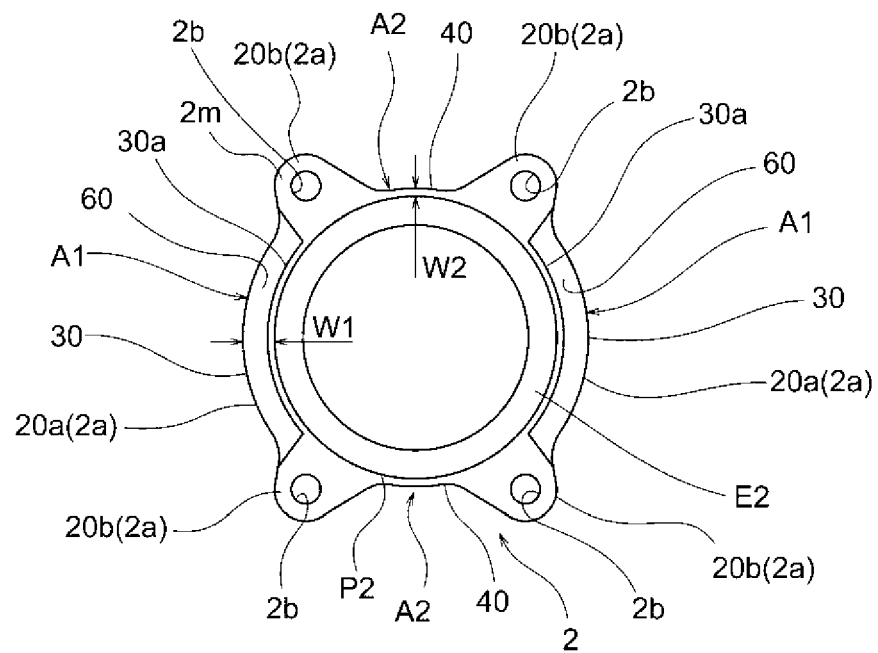
FIG. 8B is a schematic side view of the stationary ring shown in FIG. 7B.
Figure 9A:
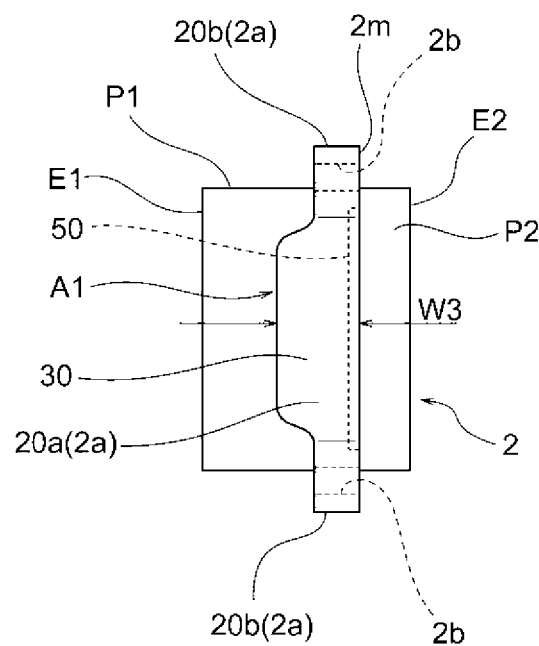
FIG. 9A is a schematic front view of the stationary ring shown in FIG. 7A.
Figure 9B:
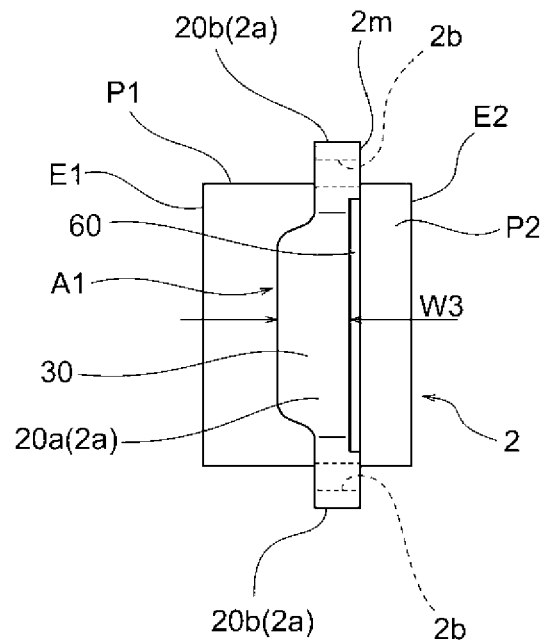
FIG. 9B is a schematic front view of the stationary ring shown in FIG. 7B.

Also, in the third embodiment, like the first embodiment, upon the formation (forging), the axial surface portion 30a of the first flange part 30 facing the inboard-side cylindrical part P2 (knuckle pilot portion) is recessed (thickness-reduced) to form the thickness-reduced portion 50 (refer to FIGS. 7A, 8A and 9A). Alternatively, upon the formation (forging), the axial surface portion 30a may be formed to be axially stepped shape in order to to form the thickness-reduced portion 60 (refer to FIGS. 7B, 8B and 9B). In the meantime, since the other configurations are the same as the first and second embodiments, the descriptions thereof are omitted.

According to each embodiment, since the outer diameter surface of the outer ring 2 has the true circle shape, it is easy to provide the outer diameter surface with a datum surface for grinding.

The invention claimed is:
1. A bearing unit comprising:
an annular stationary ring mounted to a vehicle body-side component and to be held in a non-rotating state, and
a rotating ring provided to face the stationary ring, and configured to rotate together with a wheel-side component mounted thereto,
wherein the stationary ring is provided with a mounting flange along a circumferential direction,
wherein the mounting flange is provided with a plurality of mounting holes which are arranged at unequal intervals in the circumferential direction and which are used to fasten the stationary ring to the vehicle body-side component via bolts,
wherein the mounting flange includes a first flange part located in a region in which a distance between the mounting holes adjacent in the circumferential direction is of a first dimension, and a second flange part located in a region in which the distance between the adjacent mounting holes is of a second dimension which is smaller than the first dimension
wherein a radial thickness of the first flange part is greater than a radial thickness of the second flange part,
wherein a surface of the first flange part facing the vehicle body-side component is provided with a thickness-reduced portion to reduce a contact area with a mounting surface of the vehicle body-side component,
wherein the thickness-reduced portion has a concave shape, such that the surface of the first flange part contacts the mounting surface of the vehicle body-side component around the entire periphery of the thickness-reduced portion, and
wherein an axial thickness of the first flange part is greater than an axial thickness of the second flange part.

\* \* \* \* \*